May 24, 1960   C. W. VAN RANST   2,937,514
FLEXIBLE COUPLING
Filed Aug. 18, 1958
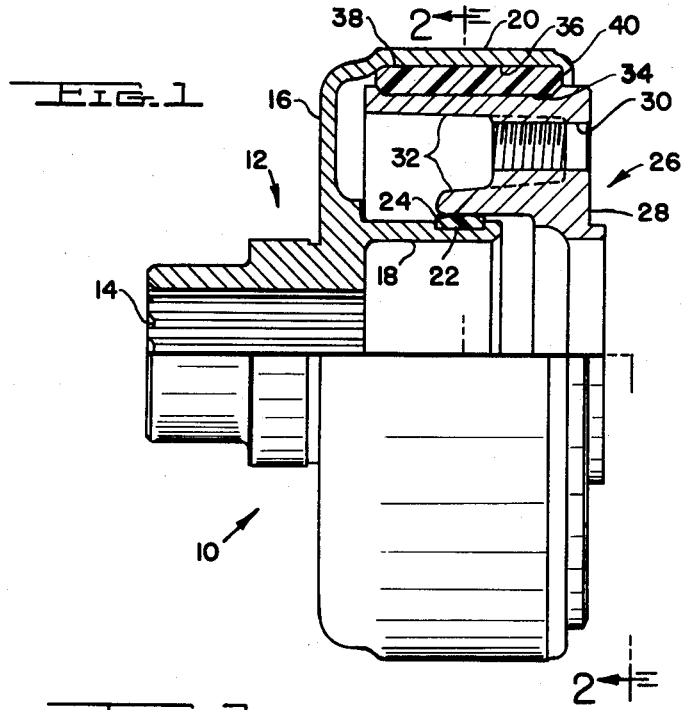
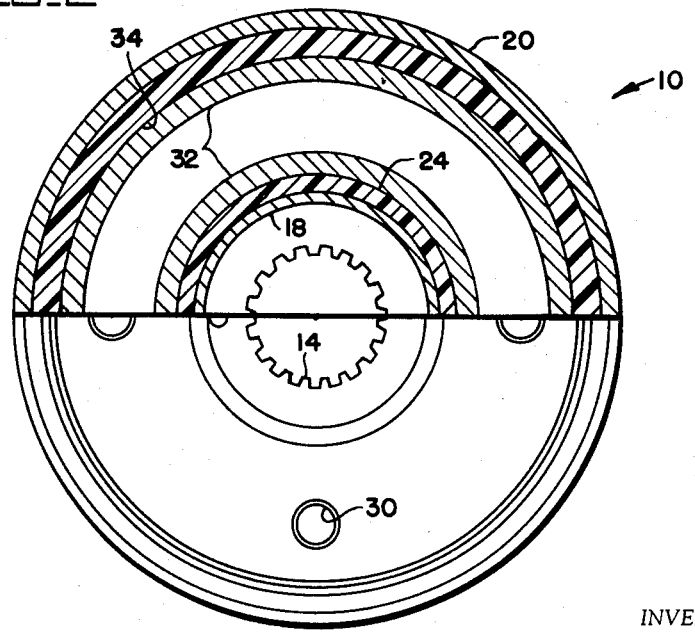
INVENTOR.
CORNELIUS W. VAN RANST
BY FINN G. OLSEN
ATTORNEY

United States Patent Office 2,937,514
Patented May 24, 1960

2,937,514

FLEXIBLE COUPLING

Cornelius W. Van Ranst, 15692 Woodland Drive, Dearborn, Mich.

Filed Aug. 18, 1958, Ser. No. 755,713

7 Claims. (Cl. 64—30)

The present invention relates to a flexible coupling, and more particularly to such a flexible coupling that is adapted for but not limited to use with marine engines.

It is an object of the present invention to provide an improved flexible coupling for connecting aligned shafts, which coupling is constructed and arranged so that it can momentarily slip when a shock overload on one of the shafts occurs without damaging the coupling.

It is another object of the present invention to provide an improved flexible coupling of the foregoing character which is constructed and arranged so that it can accommodate shear forces in both thrust and torsion.

It is still another object of the present invention to provide a flexible coupling for operatively connecting two generally aligned shafts, said coupling having a bearing member operatively engaging opposite ends of the coupling and constructed and arranged so that if there is a misalignment of the shafts there will always be uniform bearing contact on said member.

It is still another object of the present invention to provide a flexible coupling of the foregoing character which is made from dielectric material, and where all other parts that engage both ends of the flexible coupling are formed from dielectric materials so as to prevent electrolytic action from occurring through the coupling.

It is still another object of the present invention to provide a flexible coupling of the foregoing character that is characterized by its simple but very effective construction that assures a long life with optimum results in service.

Other objects of this invention will appear in the following description and appended claims, reference being had to the accompanying drawings forming a part of this specification wherein like reference characters designate corresponding parts in the several views.

In the drawings:

Figure 1 is a side elevation of one embodiment of the invention with the upper half shown in section; and Figure 2 is an end elevation taken on the line 2—2 of Figure 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, a more detailed description of the present invention will be given. The flexible coupling 10 includes a flanged member 12 which is internally splined at 14 for fitting on a shaft (not shown) for rotation therewith. The flanged member 12 has a radially projecting flange 16 which has two coaxial cylindrical flange portions 18 and 20. The radially inner flange portion 18 has an annular groove 22 around its outer periphery in which is carried a ring 24 for a purpose to be more fully explained hereinafter.

The ring 24 is preferably made from nylon which has desirable bearing as well as dielectric properties. However, other suitable materials having these same properties may be used. The outer circumference or surface of the ring 24 has a spherical radius with the center on the axis of the ring 24. Thus, when viewed in section in Figure 1, it will be seen that the ring has an arcuate outer surface.

The flexible coupling 10 includes a second flanged member 26 which has a radially extending flange 28 containing a plurality of bolt holes 30 for attachment to a second shaft (not shown) for rotation therewith. The flanged member 26 has an annular portion 32 projecting from its flange 28 in an axial direction, and being of such dimension as to fit between the cylindrical flange portions 18 and 20, and with the inner circumference of the annular portion 32 seating on the ring 24. By virtue of the arcuate outer surface of ring 24, the annular portion 32 makes a line contact therewith, and in the event the two shafts (not shown) are angularly out of alignment, the ring 24 will still maintain the line contact, although in a slightly different plane. Thus, a uniform bearing contact will always be assured even if there is a misalignment of the shafts (not shown).

The radially outer side of the annular portion 32 has a recessed portion or groove 34 facing outwardly, and the cylindrical flange portion 20 has a similar recessed portion or groove 36 facing radially inwardly and oppositely disposed to groove 34. Positioned in a preloaded condition is a rubber ring 38. The latter is in a state of compression and in view of the incompressibility of rubber, the annular portion 32 and the cylindrical flange portion 20 are maintained apart in the position shown. Furthermore, the flange members 12 and 26 cannot be pulled axially apart, because the opposite sides of the grooves lock the rubber ring in place.

The rubber ring 38 is initially rolled onto the left end of the annular portion 32. Thereafter, before the lip 40 is rolled over, the annular portion 32 with the rubber ring 38 on the left end is pressed inside the cylindrical flange portion 20 squeezing the rubber ring 38 to the shape illustrated. The lip 40 is then rolled over locking the parts together.

It is to be observed that while the material forming the ring 38 is referred to as rubber, any synthetic material having the same rubber-like properties may be used, and it is to be understood that the present invention covers such synthetic materials.

In the operation of the present invention, the flange members 12 and 26 are operably connected together only by the dielectric or nylon material of the ring 24 and the rubber of the ring 38. Thus, there can be no electrolytic action occurring through the flexible coupling 10 should the latter be used in salt water, or the like. Also, the rubber material of the ring 38 frictionally grips the surfaces of the grooves 34 and 36, but if an overload occurs, such as when a propeller strikes an underwater object, there will be a momentary slippage of the coupling 10, thereby avoiding damage to the driving or driven parts. Furthermore, the rubber ring 38 will be in shear in both thrust and torsion, thereby requiring the transmitting of all such forces through the rubber ring, and no metal to metal contact will occur even if there is a misalignment of the shafts (not shown).

Having thus described my invention, I claim:

1. A flexible coupling comprising a first flanged member having internal splines and a radially extending flange with a pair of generally coaxial cylindrical flange portions projecting in radially spaced relation therefrom, a ring of dielectric material seated on the outer circumferential surface of the radially inner cylindrical flange portion, a second flanged member having a radially extending flange with bolt apertures for attachment to a shaft and having an annular portion projecting between said cylindrical flange portions and seated on said ring, said annular portion having a radially outwardly facing groove on its outer surface, the outer cylindrical flange portion having an oppositely disposed radially inwardly facing groove on its inner surface, and an annular preloaded rubber ring carried within said outwardly and inwardly facing grooves.

2. A flexible coupling comprising a first flanged member having internal splines and a radially extending flange with a pair of generally coaxial cylindrical flange portions projecting in radially spaced relation therefrom, a nylon ring seated on the outer circumferential surface of the radially inner cylindrical flange portion, said ring having an arcuate outer surface wtih the center of the arc located on the axis of the ring and in the plane thereof, a second flanged member having a radially extending flange with bolt apertures for attachment to a shaft and having an annular portion projecting between said cylindrical flange portions and seated on the arcuate outer surface of said ring, said annular portion having a radially outwardly facing groove on its outer surface, the outer cylindrical flange portion having an oppositely disposed radially inwardly facing groove on its inner surface, and an annular preloaded rubber ring carried within said outwardly and inwardly facing grooves.

3. A flexible coupling comprising a first flanged member having a pair of generally coaxial cylindrical flange portions projecting in radially spaced relation therefrom, a nylon ring seated on the outer circumferential surface of the radially inner cylindrical flange portion, said ring having in an axial direction an arcuate outer surface with the center of the arc located on the axis of the ring and in the plane thereof, a second flanged member having an annular portion projecting between said cylindrical flange portions and seated on the arcuate outer surface of said nylon ring said annular portion having around its circumference a radially outwardly facing groove, the outer cylindrical flange portion having around its inner circumference an oppositely disposed radially inwardly facing groove, and an annular preloaded rubber ring carried within said oppositely disposed grooves.

4. A flexible coupling comprising a first flanged member having a pair of generally coaxial cylindrical flange portions projecting in radially spaced relation therefrom, a nylon ring seated on the outer circumferential surface of the radially inner cylindrical flange portion, said ring having in an axial direction an arcuate outer surface with the center of the arc located on the axis of the ring and in the plane thereof, a second flanged member having an annular portion projecting between said cylindrical flange portions and seated on the arcuate outer surface of said nylon ring said annular portion having around its circumference a radially outwardly facing groove, the outer cylindrical flange portion having around its inner circumference an oppositely disposed radially inwardly facing groove, an annular preloaded rubber ring carried within said oppositely disposed grooves in tight friction engagement therewith so as to accommodate shear forces in torsion and thrust, and means on said first and second flanged members for attaching them respectively to aligned shafts.

5. A flexible coupling as defined in claim 4 wherein said means on one of said flange members comprises splines.

6. A flexible coupling as defined in claim 4 wherein said means on one of said flange members comprises a radially projecting flange with bolt apertures.

7. A flexible coupling comprising a first rotatable member having a radially extending flange with a pair of generally coaxial cylindrical flange portions projecting in radially spaced relation therefrom, a ring of dielectric material seated on the outer circumferential surface of the radially inner cylindrical flange portion, a second rotatable member coaxial of the first rotatable member and having a radially extending flange with an annular portion projecting between said cylindrical flange portions and seated on said ring, said annular portion having a radially outwardly facing groove on its outer surface, the outer cylindrical flange portion having an oppositely disposed radially inwardly facing groove on its inner surface, and an annular preloaded rubber-like ring carried within said outwardly and inwardly facing grooves.

References Cited in the file of this patent
UNITED STATES PATENTS

| | | |
|---|---|---|
| 1,198,421 | Conklin | Sept. 19, 1916 |
| 1,217,746 | Grof | Feb. 27, 1917 |

FOREIGN PATENTS

| | | |
|---|---|---|
| 164,289 | Switzerland | Sept. 30, 1933 |